June 8, 1965  J. A. HOHOS  3,187,618
ORGAN PRE-SET

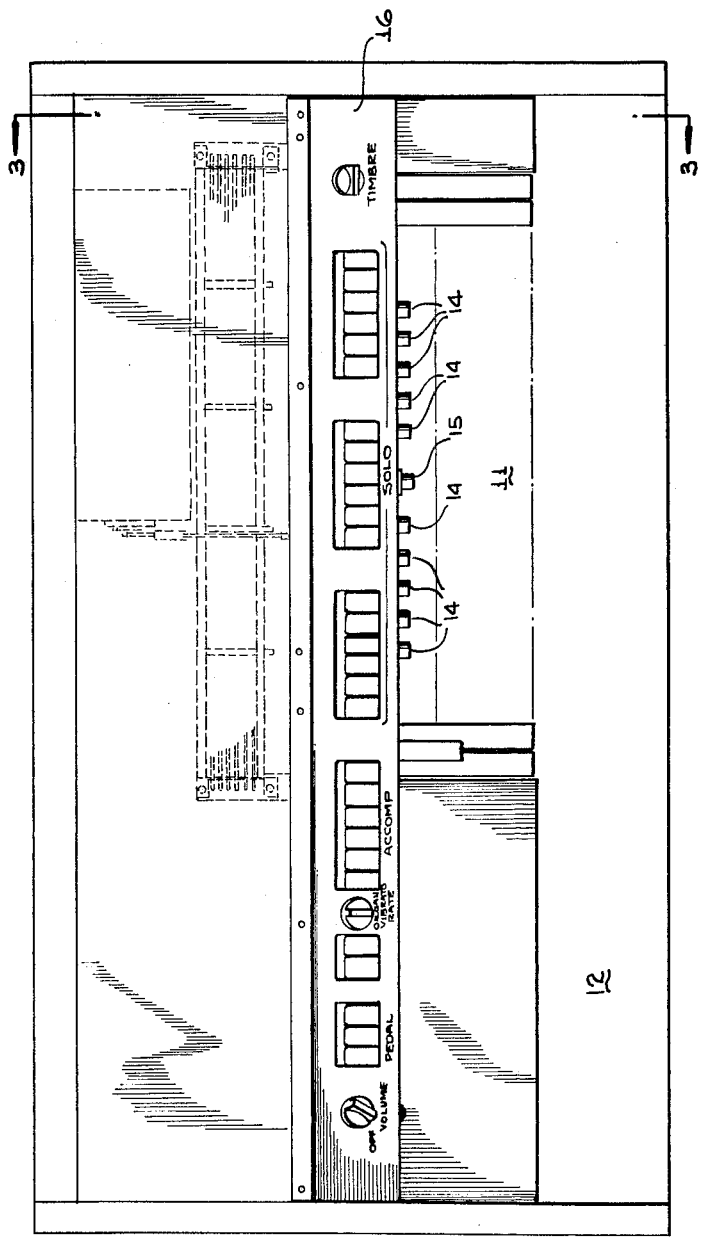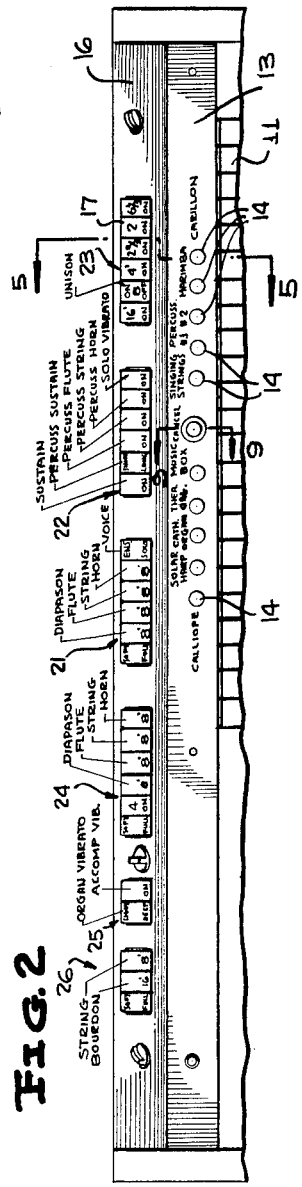

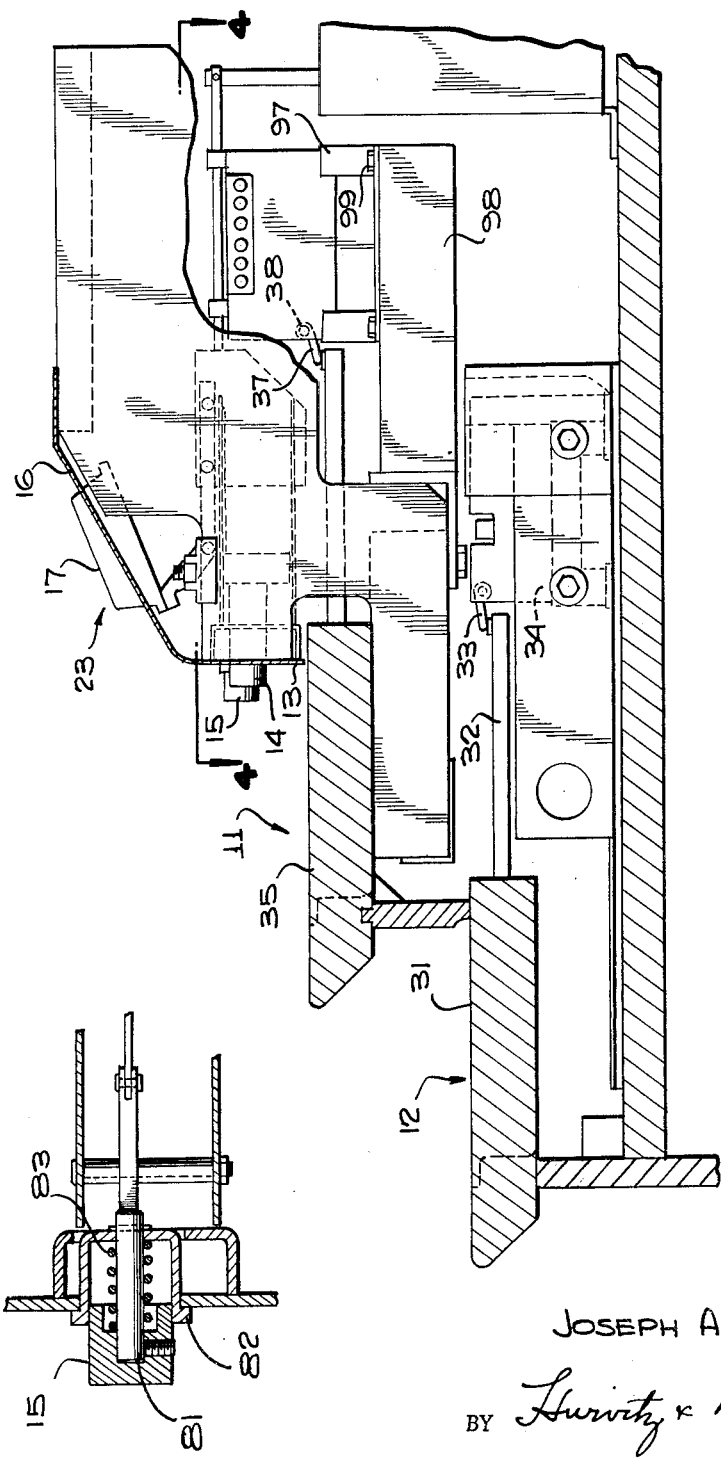

Filed Nov. 20, 1962  7 Sheets-Sheet 3

INVENTOR
JOSEPH A. HOHOS

BY Hurvitz & Rose

ATTORNEYS

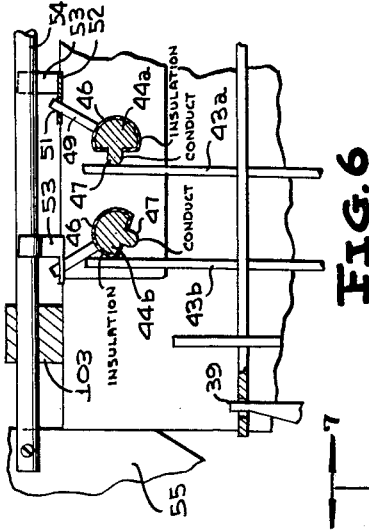
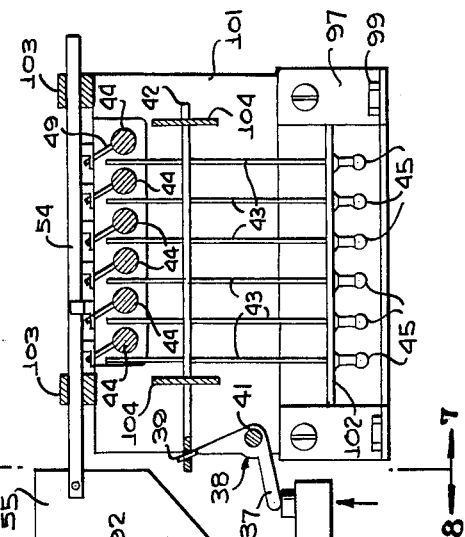
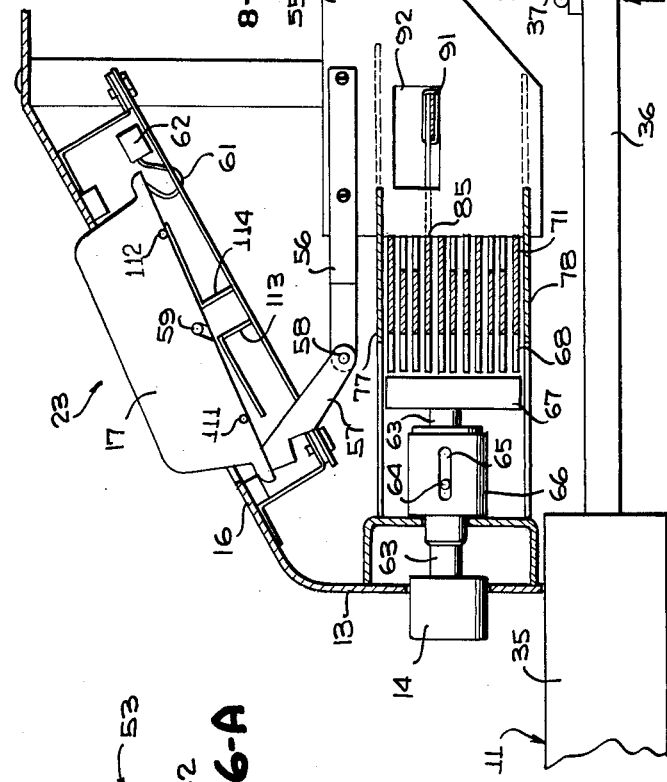

June 8, 1965

J. A. HOHOS 3,187,618

ORGAN PRE-SET

Filed Nov. 20, 1962

INVENTOR
JOSEPH A. HOHOS

BY Hurwitz & Rose

ATTORNEYS

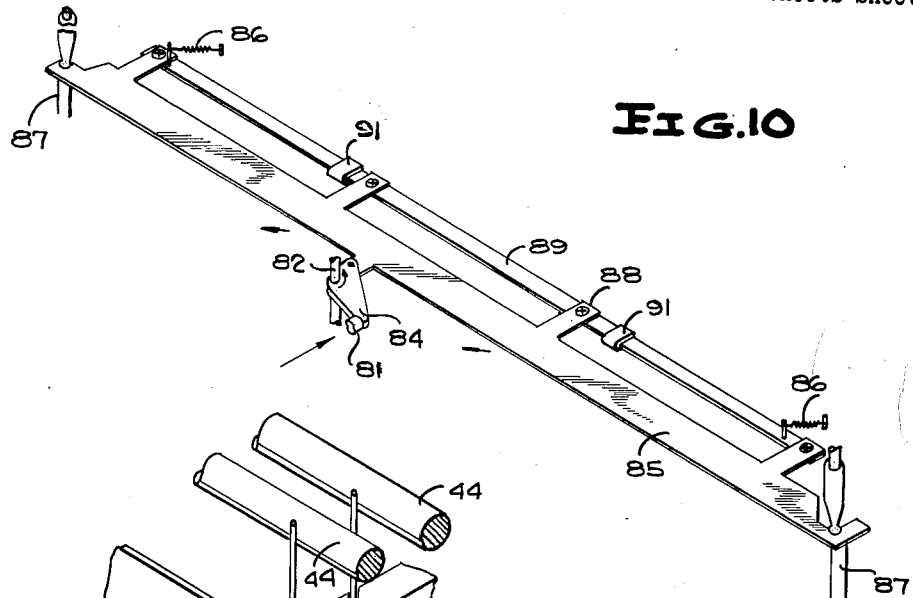
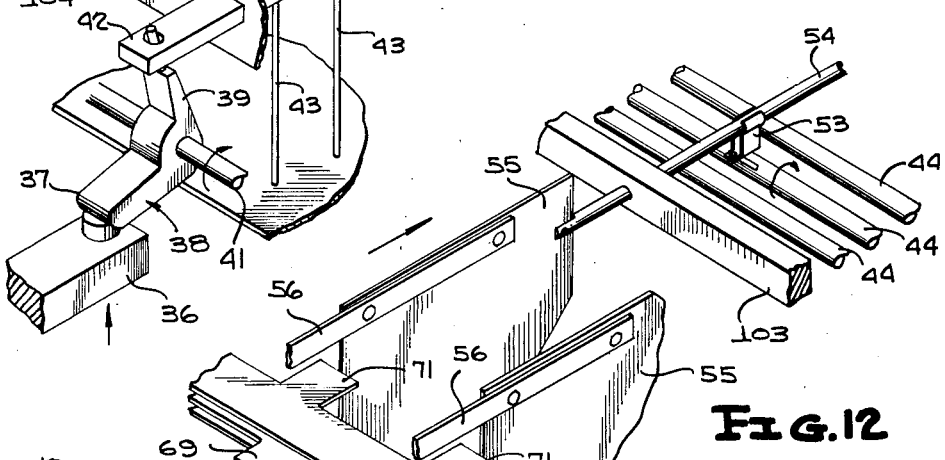
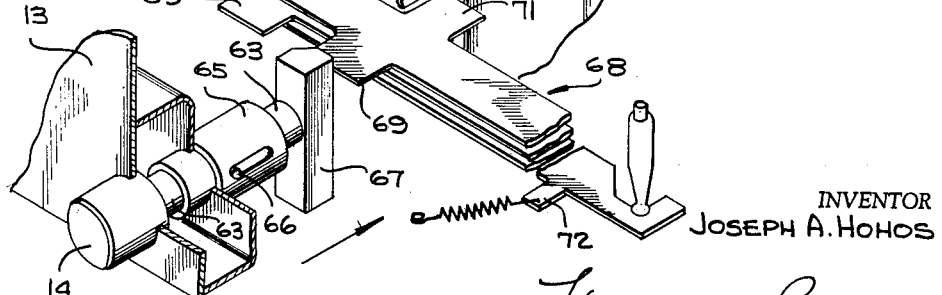

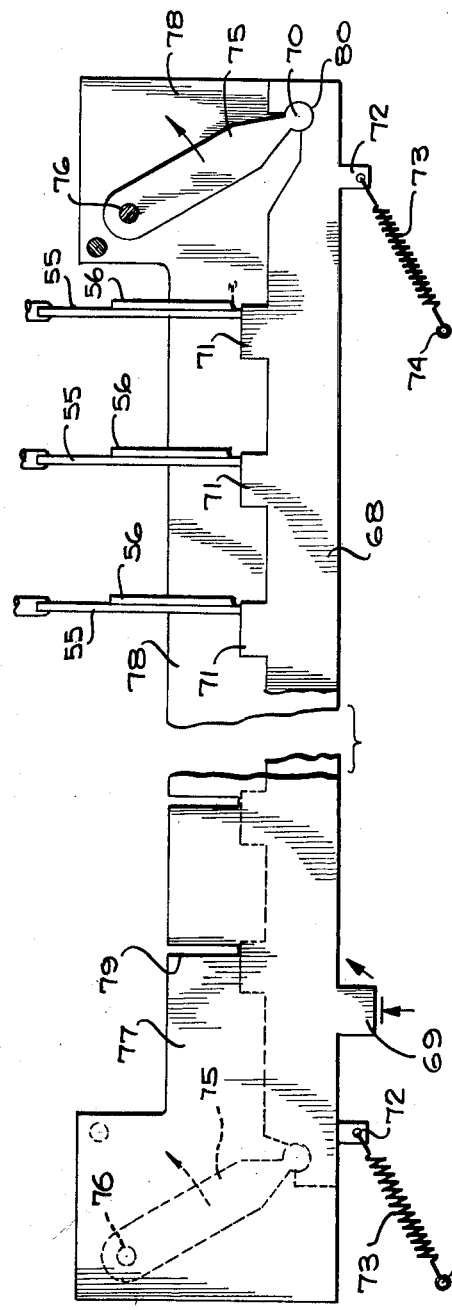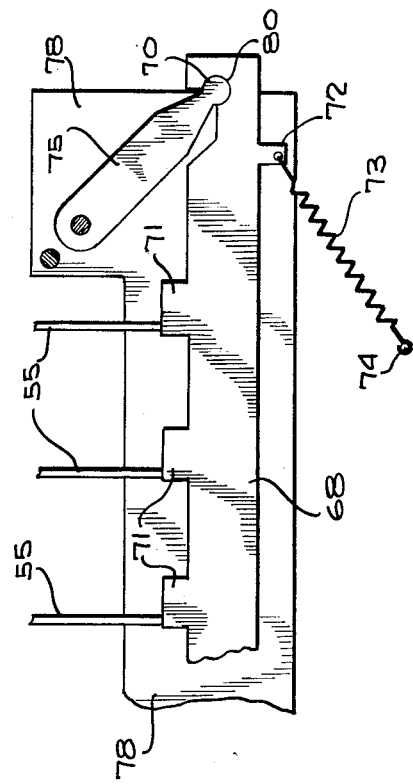

3,187,618
ORGAN PRE-SET

Joseph A. Hohos, Falls Church, Va., assignor to Scope, Inc., Falls Church, Va., a corporation of New Hampshire
Filed Nov. 20, 1962, Ser. No. 238,947
15 Claims. (Cl. 84—341)

The present invention relates generally to electronic organ pre-set mechanisms and more particularly to an organ pre-set mechanism in which a single button selectively controls which of a plurality of the organ instrumentations are attained and wherein certain tone colors normally expected with a particular instrumentation are selectively removed or tone colors not expected can be selectively added.

In the past, single button organ preset mechanisms have been designed but have generally not provided the organist with sufficient flexibility in determining which tone colors are to be played with the selected instrumentattion. Thus, once it has been decided that the instrumentation is to be a cathedral organ, a theater organ, or a calliope, etc. the tone colors (organ footages) are invariably determined.

In the organ of the present invention, the organist, in addition to being able to select the instrumentation with a single button, is able to subtract or add and subtract and add certain tone colors normally associated with the particular instrumentation. This is achieved with a relatively simple mechanical mechanism that controls the selection of musical tone generators.

The mechanism includes a plurality of stacked bars which by principle of a parallel bar linkage selectively engage and activate a multiplicity of cards, one card being provided for a plurality of predetermined musical tones. Connected to each card is at least one switch for permitting energization of a selected musical tone generator when a key is struck. Similarly positioned switches on selected cards are ganged together so that tone generators associated with a number of keys may be energized by activation of a single card. The bars and ganged switches are arranged to provide activation of at least one tone generator in response to each key being struck. To control card activation, each bar includes a plurality of tabs which engage instrumentation selection buttons on the organ. Activation of each instrumentation selection button results in translation of predetermined bars in accordance with the desired musical result. Each bar includes a further plurality of tabs which activate selected cards to a position which enables the electric tone generator circuits to be established in response to organ key activation.

To select which tone colors normally associated with an instrumentation are to be removed, a plurality of pivotable, manually operated tilt tablets, one for each tone color foot, is provided. Each tilt tablet is connected to a separate circuit actuating card. When a tilt tablet is depressed to remove a particular footage from the arrangement, the card with which it is connected is returned to its unactivated position so that all of the tone generator switches controlled by the particular card, including those ganged to the card switch, cannot be closed when a key is struck during organ operation. Hence certain tones normally associated with the instrumentation are removed. The other cards activated by the selected instrumentation control bar are not affected by the ensuing return of the selected card to its unactivated position because no permanent card and bar connection is provided. Tone colors can also be added by depressing a tilt tablet not activated by the instrumentation selection button in the opposite direction than that for tone removal. Thereby, energization of the tone generator switches controlled by the card coupled to the depressed tablet is effected when the appropriate keys are struck.

To return all of the cards to their unactivated position when it is desired to change the instrumentation, each card is provided with an aperture through which a further bar is inserted. This bar is normally positioned so that the cards can travel the necessary distance to permit circuit activation. When it is desired to change the type of organ instrumentation, this bar is translated so that it engages the edges of the apertures closest to the other bars and returns all of the cards to their initial location.

To permit ease of bar movement by the tilt tablets and the organ instrumentation buttons, the former are provided with over center springs which maintain the respective cards in their activated position even though the contact bar is withdrawn. As a result, the instrumentation buttons are returned to their unactivated position once a selection is made and thereby obviating the need for a button locking mechanism and permitting flexibility and simplicity in removing tone colors.

Because of the relatively great distances between the ten different arrangement selection buttons of the present organ and the need for moving each of the cards a like distance no matter which of the tabs on the several bars engage them, it has been found necessary to develop what we believe to be a novel mechanical activating mechanism. By this mechanism, card translation in a single direction is obtained by moving each of the activating bars to produce a resultant force which has components orthogonal and parallel to the direction of card movement. This is accomplished with a pair of parallel pivot arms, one of which is rotatably mounted at each end of the bars at the edge proximate the cards. On the other edge, at points slightly toward the center of the bar from the pivot arms, a pair of parallel extending extension spring are positioned. When a force is applied orthogonally to the longitudinal axis of the bar between the points where the pivot arms are located by an instrument selection button, the bar is translated at an angle, other than a right angle to the bar longitudinal axis, which depends on the angle subtended by the longitudinal axis, and the pivot arms. When the force is removed, the bar returns to its initial location due to the parallel forces exerted by the extension springs. To control card movement in a direction orthogonal to the longitudinal axis of the bar despite the non-orthogonal bar movement, each card rides in guide slots and is connected to a rigid bar, both of which are properly orientated to achieve the desired card movement. Since the cards and their actuating tabs are located at different positions relative to the bar longitudinal axis when the cards are in the activated and unactivated conditions, the tabs must be of sufficient width to engage the cards throughout the limits of the bar movement. By this mechanism it is possible to translate each of the cards, no matter what its location along the bar, by a like distance in response to activation of the widely separated instrumentation buttons.

It is, accordingly, an object of the present invention to provide a new and improved organ preset mechanism.

It is another object of the present invention to provide a new and improved organ preset mechanism in which a selection from one of a plurality of organ arrangements is possible with a single mechanism activated by the organist.

An additional object of the present invention is to provide an organ preset mechanism in which a selection from one of a plurality of organ arrangements is possible with a single mechanism activated by the organist and in which tone colors normally associated with the arrangement can be selectively removed or added.

A further object of the present invention is to provide a new and improved organ preset mechanism in which a multiplicity of preset buttons at relatively diverse distances from each other translate a single mechanical activating bar at the same angle by a like distance.

Yet an additional object of the present invention is to provide a single button organ preset mechanism which permits selective tone color removal or addition, or removal and addition, hence tone selection flexibility, with ease by the organist.

Still an additional object of the present invention is to provide an organ preset mechanism which is relatively inexpensive, requires virtually no maintenance, and is subject to long continuous use without the need for replacement.

The above and still further objects, features and advantages of the present invention will become apparent upon consideration of the following detailed description of one specific embodiment thereof, especially when taken in conjunction with the accompanying drawings, wherein:

FIGURES 1 and 2 are the top and front views, respectively, of the organ keyboard and preset mechanism;

FIGURE 3 is a side sectional view taken through the lines 3—3 of FIGURE 1;

FIGURE 5 is a side sectional view taken through the lines 5—5 of FIGURE 2;

FIGURE 6 is an enlarged showing of a portion of a mechanism of FIGURE 5;

FIGURE 6A is a perspective view of a clip utilized in FIGURE 6;

FIGURE 9 is a side sectional view taken through the lines 9—9 of FIGURE 2 showing the release button mechanism;

FIGURE 10 is a perspective view of the releasing bar;

FIGURE 11 is a perspective view illustrating the manner in which a key activates its control mechanism;

FIGURE 12 is a perspective view of the preset button and card activating mechanism;

FIGURE 13 is a top plan view of the card activating mechanism in an unactivated condition; and FIGURE 14 is a top plan view of a segment of the mechanism of FIGURE 13 when it is activated.

Figure 4:
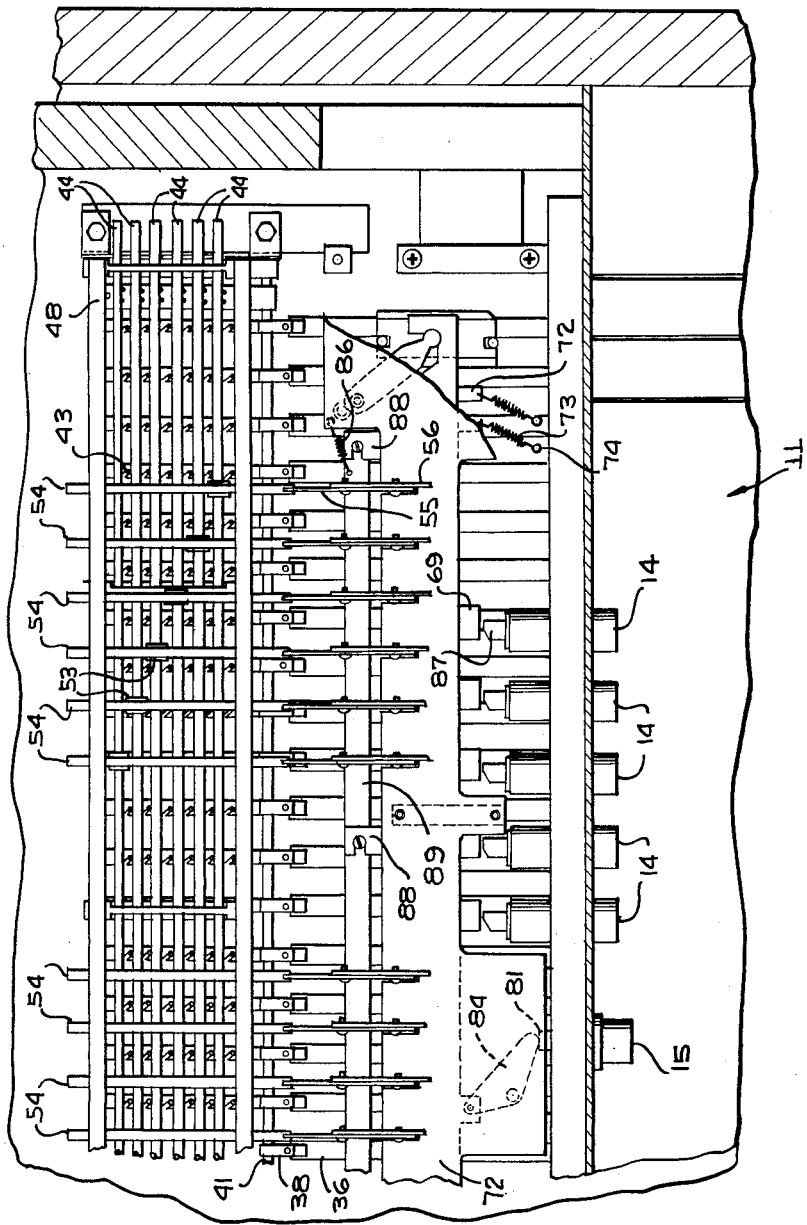
FIGURE 4 is a top sectional view taken through the lines 4—4 of FIGURE 3.

Reference is now made to FIGURES 1 and 2 of the drawings which are illustrations of the top and front view, respectively, of the keyboard mechanism of the present invention, wherein an upper or main organ manual 11 and a lower or accompanying organ manual 12 are provided. Positioned on the bezel surface 13 directly above manual 11 are a plurality of preset push buttons which selectively control the main organ instrumentation as a calliope, harp, cathedral organ, theater organ, etc. Disposed between preset buttons 14 is a cancel button 15 which, when activated, returns the organ keyboard to a neutral position so that no sounds are heard in response to key depression.

Positioned on surface 16 of bezel surface 13 are four sets 21–24 of tilt tablets 17. Tilt tablet sets 21, 22, and 23 are positioned on the right side of surface 16 directly above upper manual 11 while tilt tablet 24 is positioned generally above the lower manual 12. Tilt tablet sets 21 and 22 control the voices and effects, e.g. diapason, flute, string, horn, sustain, percussion, selected for the upper manual 11 and set 23 controls the tone color footages for the upper manual. The tilt tablets 17 of set 24 control which of the diapason, flute, string, or horn voices of the accompanying manual 12 is to be selected. To control the main and accompanying organ vibrato, tilt tablets 17 in set 25 are provided while a further tilt tablet set 26 is provided to selectively control the status of the foot pedals to a footage of eight or sixteen.

As will be seen infra, each of the tilt tablet sets, except set 23, permits direct coupling of the tones generated to produce the desired voices when the appropriate keys on manuals 11 and 12 are activated. Tilt tablet set 23, however, functions with the instrumentation preset buttons 14 to control the activation of electric lamp tone generator circuits of the type described in the co-pending application of Richard E. Williams, entitled "Photoelectric Organ," filed August 5, 1958, assigned to the same assignee as the present application and bearing Serial Number 753,354. Activation of one of the preset buttons 14 selectively permits the activation of certain lamp circuits to provide the desired tonal effect when the keys on manual 11 are struck. It is possible, however, by the use of tilt tablet set 23 to selectively withdraw or subtract certain tone colors which would normally be associated with an instrumentation normally obtained by a particular preset button activation and to add others.

Reference is now made to FIGURES 3, 4, and 5 of the drawings which disclose the general layout of the mechanism of the present invention. The mechanism comprises a switching section which includes a plurality of parallel bars 54 extending orthogonally to bezel surface 13. Several of the bars 54 have a separate coupler 53 connected thereto for controlling activation of the tone generator switches that are formed between standards 43 and rods 44, see FIGURE 6. The tone generator switches are selectively opened and closed through a plurality of parallel electrically conducting rods 44 which extend parallel to wall 13 throughout the length of the upper manual 11. The rods 54 are connected via couplers 53 to cause rotation of selected ones of rods 44 when the former are translated in response to activation of instrumentation selection buttons 14 or tilt tablets 17. In proximity to each rod 44 an electrically conducting standard 43 is located and has positioned at one of its ends a binding post 45, which is adapted to be connected to a lamp in the tone generator. The other end of standards 45 selectively engages rods 44 when a particular key in manual 11 is struck.

It is to be noted from FIGURE 4 that each of the keys does not have a rod 54 associated with it. This is because movement of one of the rods 54 results in movement of circuit establishing shafts 44 throughout the keyboard so that the tone generators associated with many of the keys are effected by a single one of the bars 54 being translated. Each of the keys 35 of upper manual 11 is coupled through one of a plurality of parallel bars 36 aligned and connected to it and one of the bell cranks 38 to circuit closing standards 43 via one of the horizontally extending rods 42.

To control the translation of rods 54, each of them is connected to one edge of a card 55, which cards are aligned longitudinally with the axis of its respective shaft 54. The other edge of cards 55 normally abuts at least one of a plurality of tabs 71 located on stacked horizontally extending parallel bars 68, the longitudinal axes of which are parallel to wall 13. Located between bars 68 is a deactivating bar 85 which is of similar shape but functions in an entirely different manner than the activating bars, as seen infra. The entire stacked arrangement of activating and deactivating bars is packaged in a single unit which is bounded by top and bottom cover members 77 and 78.

Figure 8:
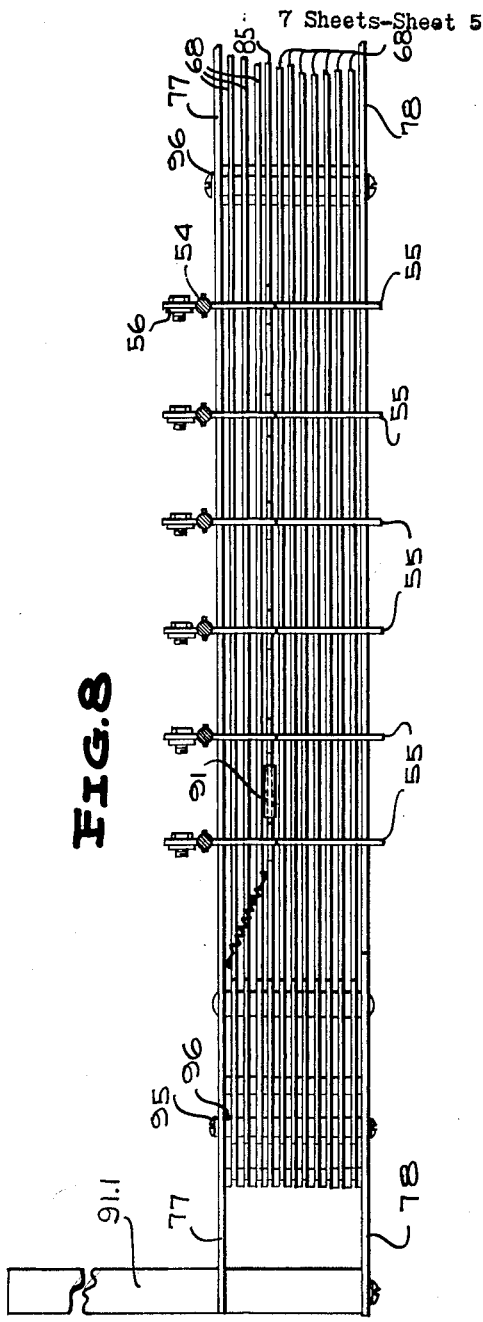
FIGURE 8 is a sectional view taken through the lines 8—8 of FIGURE 5.

The entire bar mechanism is located directly behind wall 13 and extends to a line midway between the normal unactivated position of cards 55. It is suspended within the organ by vertically extending posts 91.1 which are secured to the ends of the top and bottom covers 77 and 78, as illustrated in FIGURE 8. To maintain the horizontally extending bars 68 and 85 in alignment, a plurality of vertically extending posts 95 and separators 96 are provided between top and bottom covers 77 and 78.

Interspersed between each of the bars 68 and 85 and the top and bottom covers 77 and 78 are separators 96 and pivot fingers 75 and 87, which control movement of bars 68 and 85 as described infra. Also, extension springs 73 and 86 which control return of the bars to their initial position are attached to each of the bars and are securely fastened via binding posts that are connected between top and bottom plates 77 and 78.

Figure 7:
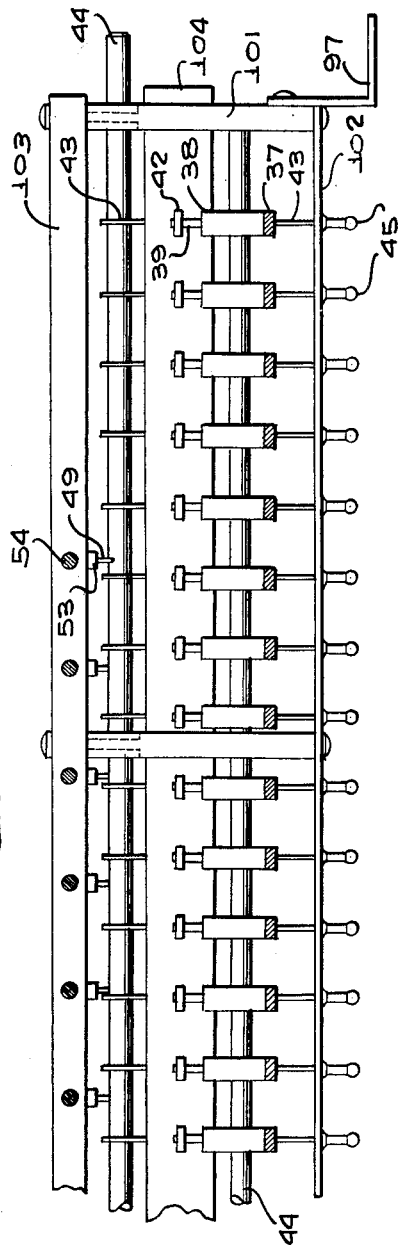
FIGURE 7 is a side sectional view taken through the lines 7—7 of FIGURE 5.

As seen from FIGURE 7 plate 102 supporting the assembly of lamp binding posts 45 is maintained in position by its connection to support 97 which is secured to horizontally extending plate 98, FIGURE 3, by screws 99. At the top and bottom of frame 101 which is secured to support 97 are plate 102 for holding lamp terminal binding posts 45 and rod 103, respectively. Rod 103 includes a plurality of bores through which the activating rods 54 connected to cards 55 are inserted. At a point midway between its ends, vertical support 101 is secured to plate 104, having a plurality of vertically extending slots, not shown, to maintain rods 42, which extend through them, aligned.

Reference is again made to FIGURE 3 of the drawings wherein key 31 of lower manual 12 is connected via a pivot point, not shown, to activating bar 32 which is part of the key assembly and is connected to bellcrank 33 at its end remote from the key. When key 31 is activated, bellcrank 33 is rotated in response to the upward movement of rod 32 so that an electric circuit is established within switch box 34. Closure of switch 34 couples predetermined accompanying tones generated as described in the above named co-pending application of Richard E. Williams to the amplifier and speaker of the organ. Key 35 of the upper manual is connected through a similar pivot bar 36 to the arm 37 of bellcrank 38, as is clearly shown in FIGURE 5. This results in rotation of the other arm 39 of bellcrank 38 about pivot point 41 so that horizontal bar 42 is translated towards the back of the organ. Bar 42 carries transversely thereto in a vertical direction a multiplicity of electrically conductive wires 43, (six being shown) which are normally maintained out of contact with rotatable rods 44.

When key 35 is activated, rod 42 translates away from wall 13 so that electrical conducting paths are selectively established between rods 44 and a plurality of lamps connected to terminal posts 45, located at the lower end of wires 43. Electric current is then applied to only selected ones of terminals 45 which have previously been activated to electrically connect with rods 44 via rods 42.

As seen in FIGURE 6, electrically conducting rods 44a and 44b include substantially semicircular, exterior insulating segments 46 and conducting teat-like segments 47, which segments are located on opposite sides of the rod. In FIGURE 6, rod 44a has been rotated by activation of its preset mechanism while rod 44b has not been effected by the preset mechanism. In consequence, an electric circuit is established through rods 44a and 43a to the terminal 45, connected to rod 44a, while no circuit is established through rods 44b and 43b. Electric power is connected to each of the rods 44 at their ends by the electrical connection established through plate 48, FIGURE 4, which is maintained at a D.C. energization potential. The circuit is completed by connecting the other side of the lamps, which are connected to terminal posts 45 to ground potential.

To selectively control the rotation of rods 44, each of them is provided with a plurality of radially extending fingers 49, FIGURES 5 and 6. Each of the fingers 49 engages an aperture 51 in finger 52 of clips 53. Clips 53 are securely fastened to horizontal activating rods 54 by means of a spring 55, FIGURE 6a, which is clamped around the circumferential edges of the rod 54.

One end of each of the rods 54 is connected to a separate activating card 55, certain of which are connected to a tilt tablet 17 via arms 56 and 57. Arm 56 extends horizontally from card 55 and is connected to the uppermost segment thereof at one end and at its other end to pivot point 58 and arm 57. The end of arm 57 remote from pivot point 58 is attached to the lower end of tilt tablet 17 so that rotation of tilt tablet 17 about pivot point 59 results in arm 57 pivoting about pin 58 and the translation of arm 56. At the end of tilt tablet 17 remote from the end at which arm 57 is connected, over center spring 61 is secured. The other end of over center spring 61 is fixedly secured to terminal post 62 so that the tilt tablet when activated at its lower and upper edges remains in that position to which it is pushed.

Card 55, in addition to being activated by tilt tablet 17, is selectively activated by instrumentation preset button 14. Button 14 is connected via rod 63, which is maintained in a constant angular position by pin 64 and slot 65 in housing 66, to vertically extending activating shoulders 67, as clearly seen in FIGURE 12.

Each of the bars 68 includes a tab 69 located on its edge in proximity to shoulder 67 and a plurality of tabs 71 which engage the edges of cards 55 remote from bars 54. Shoulders 67 extend vertically between cover plates 77 and 78 from the upper to the lower end of the assembly to achieve selective engagement with the tabs on bars 68.

Disposed on one edge at either end of bar 68 are tabs 72, FIGURE 13, each having one end of parallel extending springs 73 connected thereto, the other end of the springs being securely fastened to binding post 74, FIGURE 4. Rotatably fastened to the other edge of bar 68 to either end thereof at points beyond tab 72, are parallel pivot arms 75 which are rotatable about pivot points 76. Rotation of arm 75 relative to the longitudinal axis of bar 68 is accomplished by the cylinder 70 at the end of arm 75 which rotates in socket 80 formed at the end of bar 68. When bar 68 is in its unactivated position, each of the cards 55 which engage tabs 71 is located at the extreme right side of its respective tab when viewed from the top.

In response to movement of one of the tabs 69 on the forward edge of bar 68 by activation of shoulder 67, finger 75 rotates about pivot point 76 causing bar 68 to move in a rearward and sideward direction. In consequence, spring 73 is tensioned, and cards 55 are translated to the right, as viewed in FIGURES 5, 12, and 13. At the same time tabs 71 move transversely to the direction of cards 55 since the cards are maintained in a constant transverse position due to their engagement in the grooves in the top and bottom covers 77 and 78 of the stacked bar mechanism. It has been found that this activating mechanism produces uniform movement of cards 55 throughout the entire length of bars 68 with a minimum of mechanical force, no matter which of the tabs 69 on any bar is activated. Thus, activation of preset button 14 results in the translation of a plurality of selected activating bars 54 which control the relative position of the insulating and conducting segments of rods 44 and in response to a preselected activation of one of the keys in upper manual 11, the desired circuits are established through terminal

While I have described and illustrated one specific embodiment of my invention, it will be clear that variations of the details of construction which are specifically illustrated and described may be restored to without departing from the true spirit and scope of the invention as defined in the appended claims.

I claim:

1. An organ preset mechanism comprising a plurality of manually operated instrumentation preset controls, only one of said preset controls being provided for each of said instrumentations, a plurality of manually operated tonal controls coupled to said preset controls, said preset and tonal controls being coupled to each other so that predetermined tonal effects are normally activated by said preset controls, and means coupled to said tonal and preset controls for at will deactivating selected tonal effects normally associated with a selected preset control.

2. A system for controlling organ tone generation comprising a multiplicity of organ keys, a plurality of selectively activated tone generator switches for each of said keys, means coupled to said switches for controlling which of said switches are operated to derive tone generator outputs in response to key activation, said means for controlling including; a plurality of manually operated instrumentation preset controls, only one of said preset controls being provided for each of said instrumentations, a plurality of manually operated tonal controls coupled to said preset controls, said preset and tonal controls being coupled to each other so that predetermined determined tonal effects are normally activated by said preset controls, and means coupled to said tonal and preset controls for at will deactivating selected tonal effects normally associated with a selected preset control.

3. A system for controlling organ tone generation comprising a multiplicity of organ keys, N selectively activated tone generator switches for each of said keys, means for controlling which of said switches are operated to derive tone generator outputs in response to key activation, said means for controlling including; means for selectively positioning the Kth switch for each of said keys to a first state wherein the respective key activation derives a tone, where K selectively equals any integer in N, a plurality of linkage means coupled to each of said means for positioning, said linkage means being selectively coupled to a plurality of manually operated music instrumentation preset controls, said preset controls being coupled to said plurality of linkage means in a predetermined manner so that only one preset control is provided for each organ instrumentation, a plurality of manually operated tonal controls, one of said linkage means being coupled to each of said tonal controls whereby predetermined ones of said tonal and preset controls are coupled to each other, and means selectively coupled to said linkage means for at will activating linkage means coupled to a selected tonal control to position each of said Kth switches to a second position wherein the respective key activation fails to derive a tone normally associated with the selected preset control.

4. The system of claim 3 including means selectively coupled to said linkage means for at will activating the linkage means to position all of said switches to said second position.

5. The system of claim 3 wherein said linkage means includes a plurality of longitudinal bars, means coupled to said bars for pivoting the opposite ends of said bars about separate points, and spring means for returning said bars to an unactivated position.

6. The system of claim 5 wherein said linkage means further includes a plurality of cards selectively moved by said bars from an unactivated to an activated position, means coupled to said cards for constraining the movement of said cards to a predetermined path in response to said bars being moved to an activated position, each of said cards carrying means for controlling movement of selected switches to said first and second positions.

7. The system of claim 6 including means for connecting selected cards to predetermined ones of said tonal controls, said tonal controls including means for controlling the activated and unactivated positions of said selected cards.

8. The system of claim 6 wherein a further bar is provided, said further bar being normally positioned in an unrestraining arrangement with the movement of said cards, and means selectively coupled to said further bar for at will activating said further bar to simultaneously contact each of said cards and return said cards to their unactivated position.

9. The system of claim 8 wherein each of said cards includes an aperture through which said further bar extends.

10. In combination, an elongated bar, a separate pivot arm rotatably connected to each end of said bar, said arms and the longitudinal axis of said bar subtending equal angles, a movable mechanical output element normally contacting one edge of said bar parallel to said axis, means coupled to said element for restraining movement of said element to only substantially right angles to said axis, and means selectively coupled to said bar for applying a component of force to said bar orthogonally to said axis.

11. In combination, an elongated bar normally located in a predetermined position, a separate pivot arm rotatably connected to each end of said bar, said arms and the longitudinal axis of said bar subtending equal angles, a movable mechanical output element normally contacting one edge of said bar parallel to said axis, means coupled to said element for restraining movement of said element to only substantially right angles to said axis, means selectively coupled to said bar for applying a component of force to said bar orthogonally to said axis, whereby said bar is moved from said position, and means selectively coupled to said bar for returning said bar to said position.

12. The combination of claim 11 wherein said means for returning includes a spring connected to one of said edges.

13. In combination, a plurality of elongated stacked, aligned bars, a separate pivot arm rotatably connected to opposite ends of said bars, said arms and the longitudinal axes of said bars subtending equal angles, a movable mechanical output element normally contacting one edge of selected ones of said bars, said one edge being parallel to the longitudinal axes of said bars, means coupled to said element for restraining movement of said element to only substantially right angles to said axes, and means selectively coupled to said bar for applying a component of force to selected ones of said bars orthogonally to said axes.

14. An organ preset mechanism comprising a plurality of elongated stacked, aligned bars, a separate pivot arm rotatably connected to opposite ends of said bars, said arms and the longitudinal axes of said bars subtending equal angles, a plurality of movable mechanical elements, said elements normally contacting one edge of selected ones of said bars and arranged to be moved by said bars in response to bar movement in a predetermined direction, each of said elements when moved by said bars being connected to permit activation of an organ tone generator, a plurality of organ arrangement controls, said controls including means for applying a component of force to selected ones of said bars orthogonally to said axes.

15. An organ preset mechanism comprising a plurality of elongated stacked, aligned bars, a separate pivot arm rotatably connected to opposite ends of each of said bars, said arms and the longitudinal axes of said bars subtending equal angles, a plurality of movable mechanical elements, said elements normally contacting one edge of selected ones of said bars and arranged to be moved by said bars in response to bar movement in a predetermined direction, each of said elements when moved by said bars being connected to permit activation of an organ tone generator, a plurality of organ arrangement controls, said controls including means for applying a component of force to selected ones of said bars orthogonally to said axes, each of said controls comprising a single mechanism for activating predetermined ones of said bars, said predetermined ones of said bars being selected to provide an organ arrangement.

References Cited by the Examiner
UNITED STATES PATENTS

| | | | |
|---|---|---|---|
| 1,123,216 | 1/15 | Austin | 84—343 |
| 1,131,814 | 3/15 | Austin | 84—345 |
| 1,640,307 | 8/27 | Austin | 84—345 |
| 2,699,085 | 1/55 | Zuck | 84—345 X |
| 2,845,831 | 8/58 | Hammond | 84—423 |
| 2,954,716 | 10/60 | Raymond | 84—337 |
| 3,110,211 | 11/63 | Elbrecht | 84—423 |

LEO SMILOW, *Primary Examiner.*